May 29, 1951　　　　　　　　J. BUSH　　　　　　　　2,554,558
HOG TRAP
Filed May 11, 1948　　　　　　　　　　　　　　　2 Sheets-Sheet 1
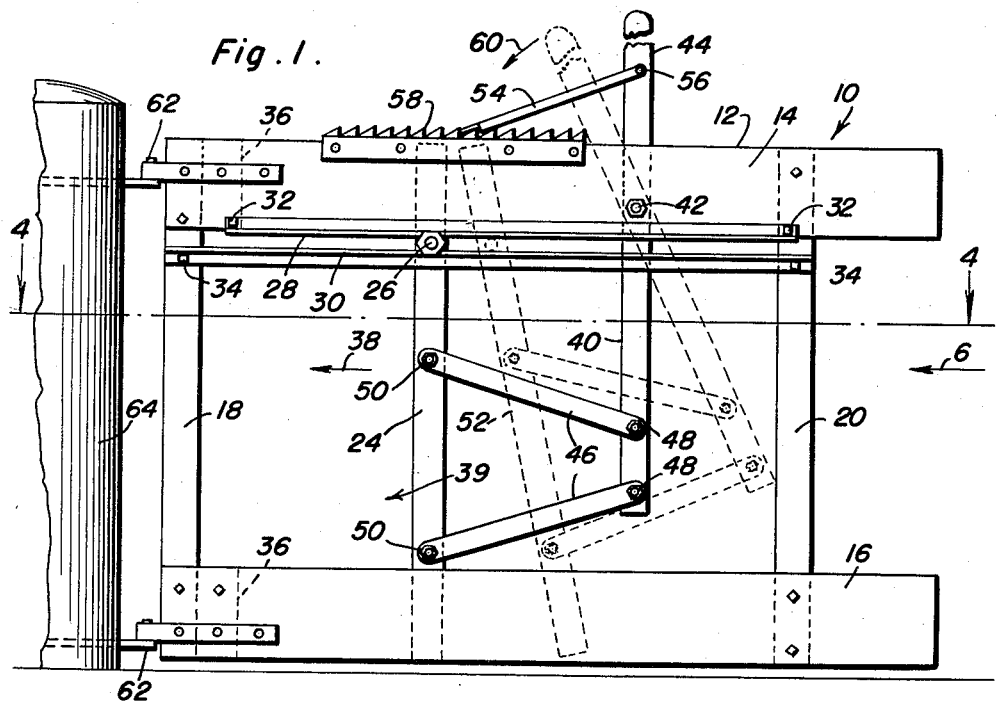
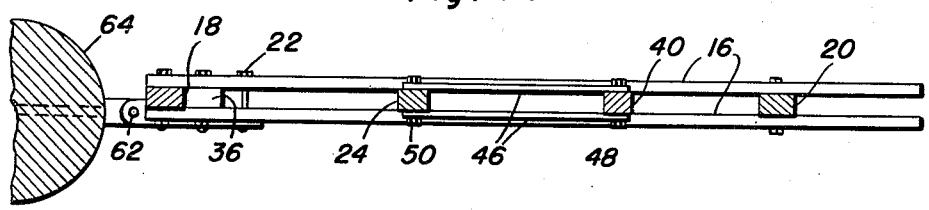
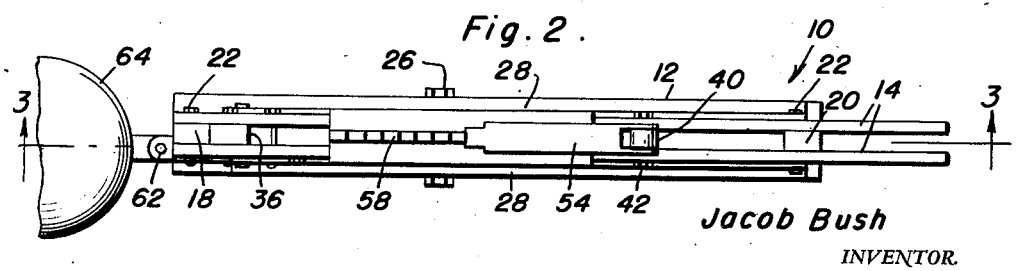
Jacob Bush
INVENTOR.

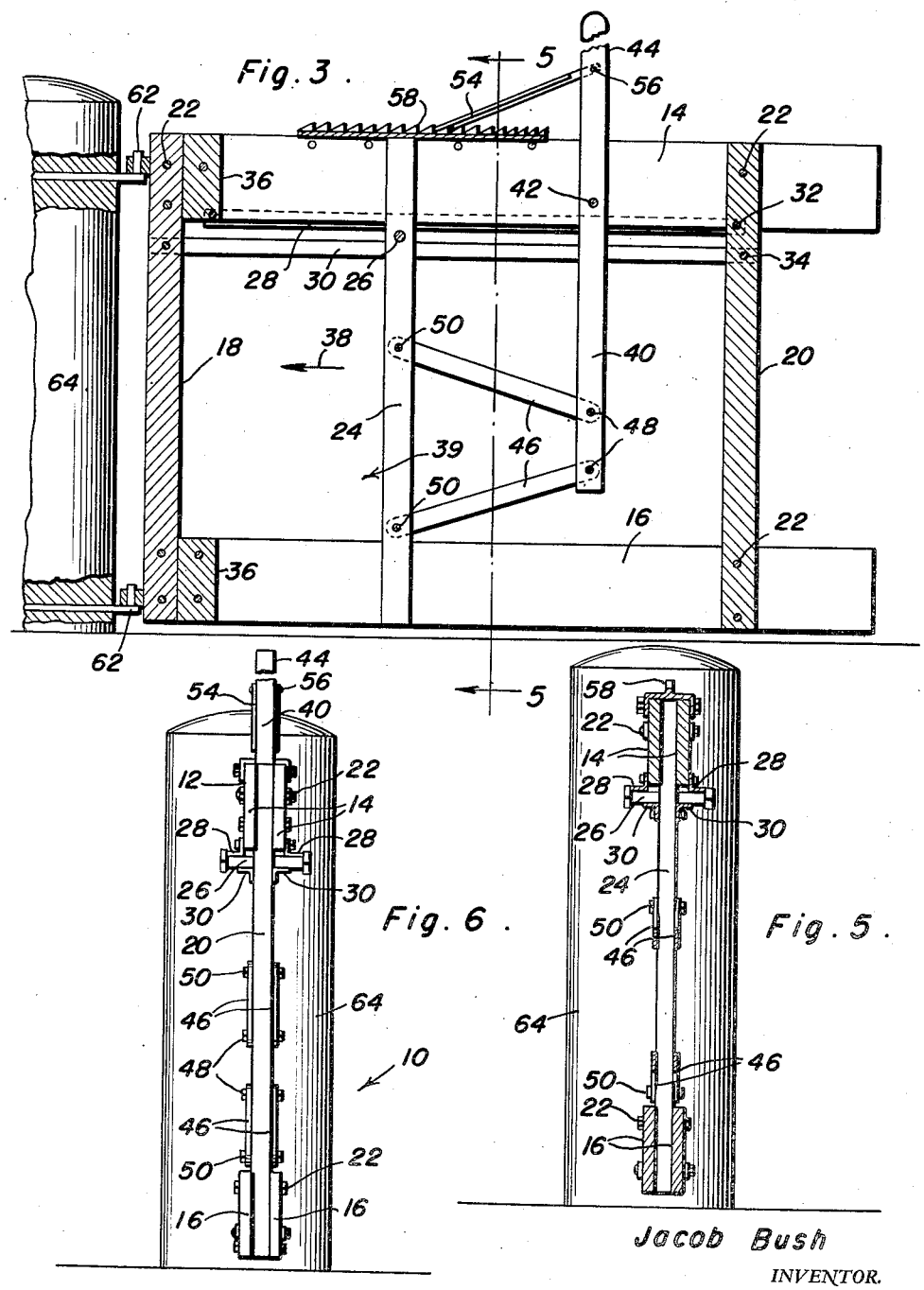

Patented May 29, 1951

2,554,558

UNITED STATES PATENT OFFICE 2,554,558

HOG TRAP

Jacob Bush, Lyndon, Ill.

Application May 11, 1948, Serial No. 26,433

1 Claim. (Cl. 119—98)

This invention relates to new and useful improvements and structural refinements in hog traps, and the principal object of the invention is to facilitate convenient and expeditious catching of hogs and other animals, and restraining such animals from movement while they are being branded, and the like.

This object is achieved by the provision of the instant trap wherein a movable restraining bar is provided upon a framework, this being so arranged that the restraining bar coacts with members of the framework in defining what may be referred to as an expansible and contractable passage. By virtue of this form of construction, it is only necessary to urge the animal into the passage, whereupon by moving the restraining bar on its framework, the passage may be contracted so as to firmly and securely grip the animal.

An important feature of the invention lies in the provision of releasable means for locking the restraining bar against movement tending to enlarge or expand the passage.

An additional feature of the invention resides in mounting the entire trap on hinges so that it assumes the nature of a door which may be readily swung to an open position when the trap is not in use, so that it does not interfere with the flow of traffic through the doorway.

An important advantage of the invention resides in its simplicity of construction and in the ease and convenience with which it may be manipulated.

With the above more important objects and features in view and such other objects and features as may become apparent as this specification proceeds, the invention consists essentially of the construction and arrangement of parts as shown in the accompanying drawings in which:

Figure 1 is a front elevational view of the invention;

Figure 2 is a top plan view thereof;

Figure 3 is a cross sectional view, taken substantially in the plane of the line 3—3 of Figure 2;

Figure 4 is a cross sectional view, taken substantially in the plane of the line 4—4 of Figure 1;

Figure 5 is a cross sectional view, taken substantially in the plane of the line 5—5 in Figure 3, and;

Figure 6 is an elevational view, taken in the direction of the arrow 6 in Figure 1.

Like characters of reference are employed to designate like parts in the specification and throughout the several views.

Referring now to the accompanying drawings in detail, the invention consists of a hog trap designated generally by the reference character 10, the same embodying in its construction a substantially rectangular frame 12 disposed in a vertical plane and consisting of pairs of upper and lower horizontal cross members 14, 16 respectively, and a pair of upright side members 18, and 20.

The side members 18, 20 are secured by suitable bolts 22 between the pairs of cross members 14, 16 as is best shown in Figures 4 and 5, so that the entire frame is firmly and securely held together.

A substantially upright restraining bar 24 is laterally slidable between the pairs of cross members 14, 16, the sliding movement of this bar being guided by means of a transversely extending pin 26 with which the upper end portion of the bar 24 is provided. The end portions of the pin 26 are slidable, in turn, between pairs of spaced parallel angles 28, 30 which are secured as at 32, 34 respectively to the frame 12, substantially as shown (see Figure 1).

Suitable stop blocks 36 are secured between the pairs of frame members 14, 16 immediately adjacent the member 18, these blocks functioning as stops for restricting the movement of the restraining bar 24 in the direction of the arrow 38. It is to be noted that the bar 24 coacts with the members 14, 16, and 18 in defining what may be referred to as an expansible and contractable passage 39, that is to say, by moving the bar 24 in the direction of the arrow 38, the size of the passage 39 will be decreased, while movement of the bar 24 in the direction opposite to the arrow 38 will result in an enlargement of the passage.

Means are provided for sliding the restraining bar 24, said means including a substantially upright lever 40 pivoted intermediately of its length as at 42 between the cross members 14, the upper, relatively short portion of this lever constituting an actuating handle 44 while pairs of mutually divergent links 46 are pivoted as at 48 to the lower, relatively long portion of the lever, substantially as shown.

The remaining end portions of the links 46 are pivoted as at 50 to an intermediate portion of the restraining bar 24, and it will be apparent that by simply moving the handle portion 44 of the lever 40, the lever through the medium of the connecting links 46 will cause the bar 24 to unequally slide between the frame members 14, 16, as indicated by the phantom lines 52 (see Figure 1).

An arm 54 of a substantially U-shaped cross sectional configuration is pivoted as at 56 to the handle 44, the free end portion of this arm being operatively engageable with the teeth of a rack strip 58 secured to the frame member 14. It is to be noted that the teeth of the rack strip 58 are inclined or pointed toward the handle 44, so that while the arm 54 engages the rack strip, the handle cannot be moved in the direction of the arrow 60 until the arm 54 is disengaged from the rack.

By virtue of this arrangement the bar 24 will be releasably prevented from moving in a direction opposite to that of the arrow 38, tending to enlarge the opening 39.

When the invention is placed in use, it is only necessary to urge the animal into the passage 39 when the passage is as large as possible, whereupon by simply actuating the handle 44 of the lever 40, the animal may be clamped between the restraining bar 24 and the side member 18 of the frame 12, thus firmly and securely retaining the animal while it is being branded, or the like. It is to be noted that while the animal is being clamped between the bar 24 and the side member 18, the arm 54 and the rack strip 58 will effectively prevent the bar 24 from moving away from the member 18 so as to enlarge the passage. In this manner, once the animal is clamped in the trap, the operator does not need to hold the handle 44 and may direct his entire attention to the branding of the animal. Needless to say, the animal may be readily released by simply disengaging the arm 54 from the rack 58 and moving the handle 44 so as to slide the bar 24 away from the member 18.

If desired, the entire trap may assume the form of what may be referred to as a gate, the same being suspended by means of suitable hinges 62 from a suitable supporting structure, such as a post 64. This arrangement will permit the trap to be swung to an open position, so to speak, while it is not being used, thereby facilitating unobstructed traffic through the doorway.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a hog trap, the combination of an upper horizontal member, a lower horizontal member, a stationary upright side member having upper and lower ends thereof secured to the upper and lower horizontal members, an upwardly extending restraining bar slidable in the horizontal members toward and away from said side member, said restraining bar coacting with the upper and lower horizontal members and said side member in defining a hog passage which is substantially narrow and rectangular when the restraining bar is slid toward the side member, an upwardly extending lever pivoted intermediate the ends thereof to said upper horizontal member and having a relatively short upper portion affording a handle and a relatively long lower portion disposed adjacent said restraining bar at the outside of said passage, and a pair of mutually divergent links pivoted at vertically spaced points to the lower end portion of said lever, the divergent ends of said links being pivoted to an intermediate portion of said restraining bar, whereby the latter may be slid in one direction to clamp a hog in said passage between said side member and the restraining bar and whereby the latter may be slid unequally in a relatively opposite direction to enlarge said passage so that it is wider at the top than at the bottom.

JACOB BUSH.

REFERENCES CITED

The following references are of record in the file of this patent:

UNITED STATES PATENTS

| Number | Name | Date |
|---|---|---|
| 129,832 | Kieler | July 23, 1872 |
| 383,218 | Gentry | May 22, 1888 |
| 1,323,072 | Kuhlman | Nov. 25, 1919 |
| 1,514,429 | Burmester | Nov. 4, 1924 |
| 1,815,545 | Brown | July 21, 1931 |
| 2,214,969 | McNett | Sept. 17, 1940 |